(12) United States Patent
Zappel

(10) Patent No.: US 7,640,865 B2
(45) Date of Patent: Jan. 5, 2010

(54) RAIL CAR SHUNTING DEVICE FOR ROAD-RAIL OPERATION

(76) Inventor: Wolfgang Zappel, Mühlstrasse 17, D-74906 Bad Rappenau (DE)

( * ) Notice: Subject to any disclaimer, the term of this patent is extended or adjusted under 35 U.S.C. 154(b) by 219 days.

(21) Appl. No.: 11/807,559

(22) Filed: May 29, 2007

(65) Prior Publication Data

US 2007/0295238 A1  Dec. 27, 2007

(30) Foreign Application Priority Data

May 29, 2006 (DE) .................. 10 2006 025 188
Jul. 13, 2006 (DE) .................. 20 2006 010 790 U

(51) Int. Cl.
*B61C 11/00* (2006.01)
(52) U.S. Cl. .................. 105/26.1; 105/215.1; 105/215.2
(58) Field of Classification Search .............. 105/26.1, 105/72.2, 215.1, 215.2
See application file for complete search history.

(56) References Cited

U.S. PATENT DOCUMENTS

| | | | | |
|---|---|---|---|---|
| 3,399,633 A | * | 9/1968 | Herscovitch | 105/26.1 |
| 3,633,514 A | * | 1/1972 | Deike | 105/72.2 |
| 4,167,142 A | * | 9/1979 | Ames | 105/72.2 |
| 4,305,336 A | * | 12/1981 | Hunsberger et al. | 105/215.1 |
| 6,835,248 B1 | * | 12/2004 | Haas et al. | 118/323 |
| 7,416,040 B2 | * | 8/2008 | Dvorak | 180/167 |

\* cited by examiner

*Primary Examiner*—S. Joseph Morano
*Assistant Examiner*—Zachary Kuhfuss
(74) *Attorney, Agent, or Firm*—Laurence A. Greenberg; Werner H. Stemer; Ralph E. Locher

(57) ABSTRACT

A rail car mover for road-rail operation is enabled for shunting rail cars that are guided on two parallel rails. The rail car mover has a bogie and wheels which are mounted thereon and have rubber tires. Each wheel is assigned a bolt element, or a disk, which can be moved by way of an adjusting device from a first retracted position for the road mode in which the ground-side end face of the bolt element is located above the rolling level of the wheel, beyond the rolling level in the direction of the ground into a second deployed position for the rail mode in which the ground-side end face of the bolt element is located underneath the rolling level in such a way that the external circumferential faces of the bolt element of two wheels which are assigned to one another extend along the inner lateral edges and/or the outer lateral edges of the rails in order to guide the wheels.

22 Claims, 3 Drawing Sheets

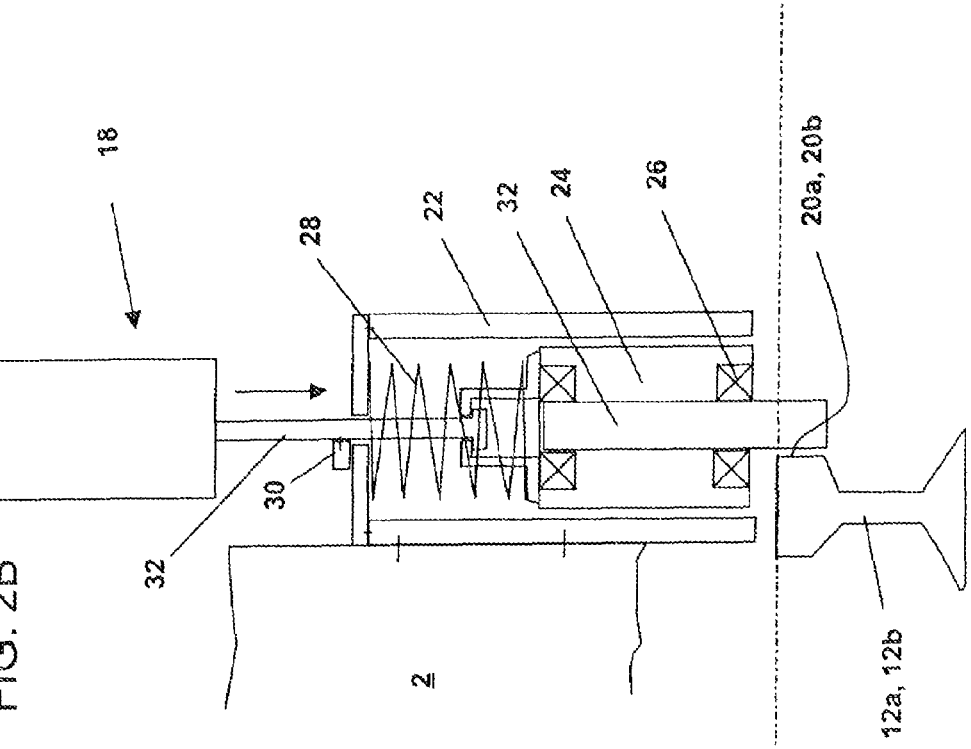
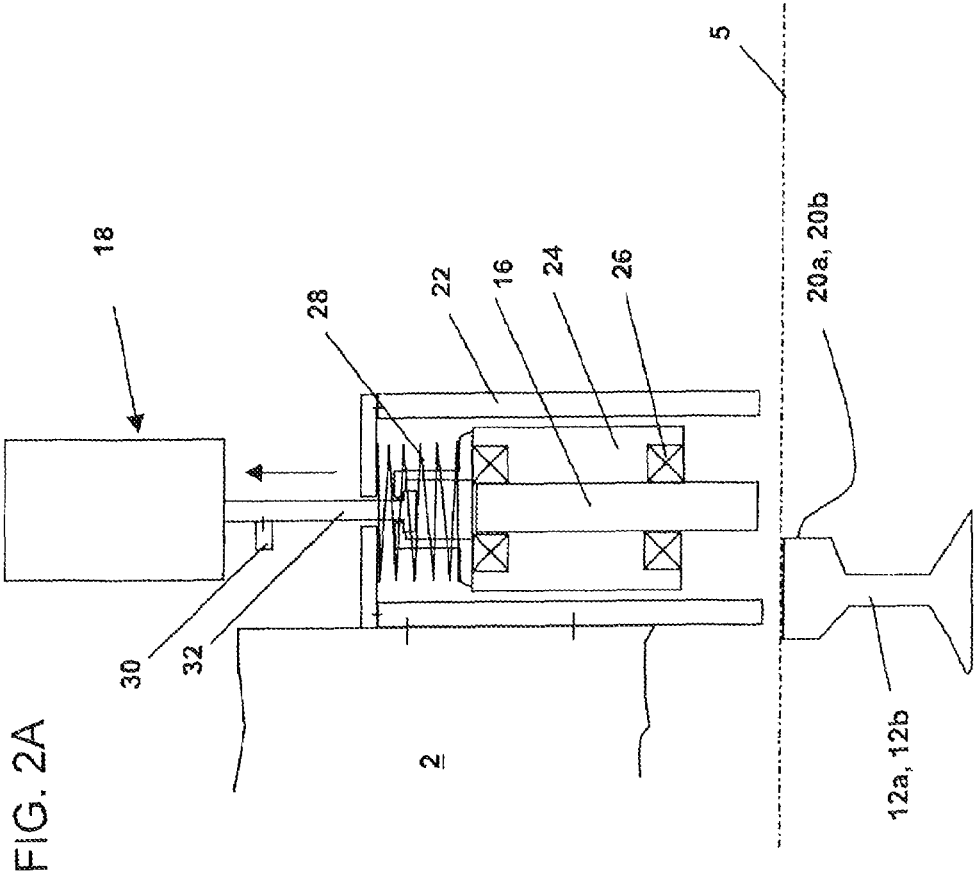

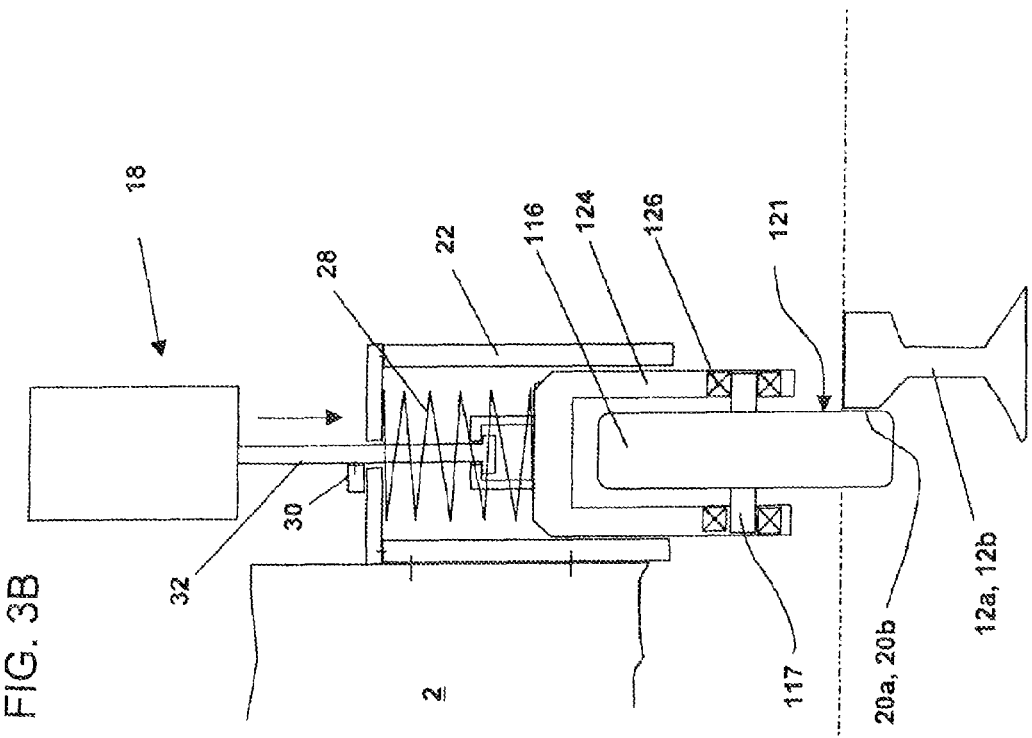
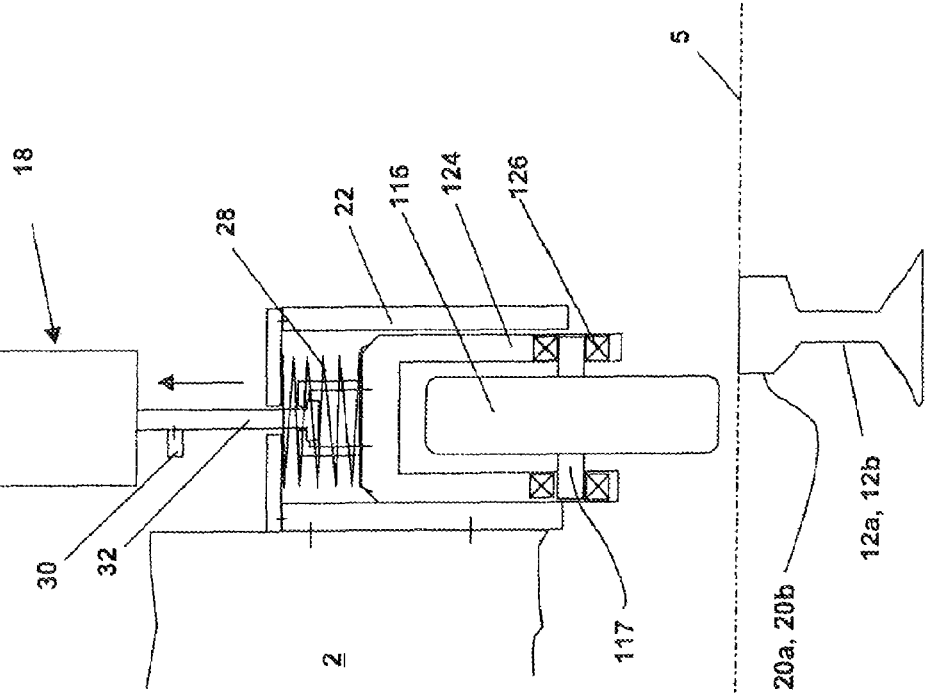

RAIL CAR SHUNTING DEVICE FOR ROAD-RAIL OPERATION

CROSS-REFERENCE OF RELATED APPLICATIONS

This application claims the priority, under 35 U.S.C. § 119, of German applications DE 10 2006 025 188.1, filed May 29, 2006, and DE 20 2006 010 790, filed Jul. 13, 2006; the prior applications are herewith incorporated by reference in its entirety.

BACKGROUND OF THE INVENTION

Field of the Invention

The invention relates to a rail car shunting device for road-rail operation, also referred to as a rail car mover, or a road-rail vehicle. The rail car shunting device for road-rail operation allows for switching rail cars that are guided on tracks with two parallel rails. The rail car mover has a bogie and wheels which are mounted thereon and which are provided with rubber tires.

Rail car shunting devices are used on private or public rail networks for shunting operations of rail cars and have, in addition to the rubber tires for conventional road mode, a bogie with four rail wheels which are adapted to the gauge of the respective rail network and which enable the vehicles to be able to move along the rails of the rail network after the deployment of the rail wheels.

In this context, the changeover to rail mode is done by deploying the bogie with the rail wheels by means of activation devices in the form of hydraulic cylinders or pneumatic cylinders, and as a result the vehicle can be lifted over the rails so that the driven wheels for the road mode are subsequently in the air.

The vehicle is driven in the rail mode here using, for example, hydraulic motors which drive the rail wheels in order to make available the drive torques which are necessary to shunt the rail cars which weigh, for example, 800 t, on the rails with all four rail wheels being preferably driven in order to obtain the highest possible traction force or traction power.

In this context, with the known rail car shunting devices there is the problem that, in addition to the wheel set of four rail wheels, they additionally must have a further wheel set of at least 3 road wheels which have rubber tires and which not only have to be retracted and deployed in a costly fashion by means of suitable pneumatic or hydraulic adjusting devices but also have to be of a steerable design in order to maneuver the rail car shunting device on a level road surface and to move it onto the rails. As a result of the associated high degree of expenditure on devices the known rail car shunting devices are comparatively expensive and consequently also liable to faults owing to the complicated mechanics/hydraulics.

BRIEF SUMMARY OF THE INVENTION

It is accordingly an object of the invention to provide a rail car mover with rail and road propulsion which overcomes the above-mentioned disadvantages of the heretofore-known devices and methods of this general type and which provides for a rail car shunting device which is structurally simple and which can be used both in road and rail mode without restrictions.

With the foregoing and other objects in view there is provided, in accordance with the invention, a rail car shunting device, or a rail car mover for road-rail operation, for shunting rail cars guided on a track with mutually parallel rails. The novel device comprises:

a bogie having four wheels with rubber tires;

bolt elements each assigned to a respective the wheel and mounted for movement from a first, retracted position for a road mode in which a lower end face of the bolt element is disposed above the rolling level of the wheel, downward beyond the rolling level into a second, deployed position for a rail mode in which the lower end face of the bolt element is disposed below the rolling level;

an adjusting device for moving each the bolt element between the retracted position for the road mode and the deployed position for the rail mode, such that, in the deployed position, outer peripheral faces of the bolt elements of two wheels that are assigned to one another extend along an inner lateral edge and/or an outer lateral edge of the rails in order to guide the wheels on the rails.

With the above and other objects in view there is also provided in accordance with an alternative aspect of the invention, a similar rail car mover wherein disk elements are each assigned to a respective wheel and mounted for movement from a first, retracted position for a road mode in which the disk element is disposed above the rolling level of the wheel, downward beyond the rolling level into a second, deployed position for a rail mode. The adjusting device moves each the disk element between the retracted position for the road mode and the deployed position for the rail mode, such that, in the deployed position, lateral end faces of the disk element of two wheels that are assigned to one another extend along an inner lateral edge and/or an outer lateral edge of the rails in order to guide the wheels on the rails.

In other words, according to the invention, a rail car shunting device for road-rail operation, with which in particular rail cars can be switched individually in a known fashion on two rails or tracks which extend parallel to one another or else in groups comprises a bogie on which preferably four wheels which have rubber tires are mounted. Each of the wheels, which are arranged in pairs along an axle at a distance corresponding to the distance between the rails and which accordingly run on the rails, is assigned a bolt element for guiding the wheels or the rail car shunting device on the rails. The bolt elements which are assigned to each wheel can, according to the invention, be moved using an adjusting device, which also includes a manual adjusting device, from a first retracted position for the road mode, in which the ground-side end face of the bolt element is located above the rolling level of the wheel, beyond the rolling level into a second deployed position for the rail mode in which the ground-side end face of each bolt element is located underneath the rolling level and the preferably cylindrical case shaped external circumferential faces of the bolt elements which, in relation to one axle, respectively extend in a pair in the region of the inner edges of the tracks or rails. In this context, there is preferably a distance of, for example 1 mm up to 10 mm or even more between the edge of each rail and the circumferential face of the bolt element so that during the rail mode just one of the two bolt elements of a pair of wheels is ever in contact with the edge, which advantageously reduces the friction if bolt elements which are mounted in a rotationally fixed fashion on the bogie are used.

In the preferred embodiment of the invention, the bolt elements are however preferably rotatably mounted in bearings, as a result of which the bolt elements can rotate during the rail mode when there is contact with the edges of the tracks, which again advantageously reduces the frictional forces.

According to a further idea on which the invention is based, each bolt element has a spring elastic force applied to it in the direction of the ground by spring elastic means, in particular a helical compression spring, as a result of which the bolt element is moved into the first position counter to the spring elastic force as it moves over from level surfaces in the track region, such as are also used to move the rail car shunting device according to the invention onto and off the rails, when the end face of the bolt element makes contact with the upper side of the run up face or else an object, such as a stone or the like, which has become inadvertently jammed in the gap between the edge of the rail and the run up face.

In the preferred embodiment of the invention, the adjusting device comprises a servomotor which acts on the bolt element and which can be used to move the bolt element out of the first position into the second position by motor. In this context, the servomotors of all four bolt elements can preferably be activated from the control console or the drawbar of the rail car shunting device by means of an electronic control device.

According to a further idea on which the invention is based, the adjusting device of each bolt element comprises a linear guide which is preferably mounted on the bogie and a support which is displaceably guided in the guide and which can, for example, have a rectangular cross section and on which the bolt element is preferably rotatably mounted by means of ball bearings.

In this embodiment of the invention there is furthermore provision for the spring elastic means to comprise a helical spring which acts between the support and the guide and which applies the spring elastic force to the support in the direction of the second deployed position, for which purpose the movement of the support into the second deployed position is limited by a stop and the helical spring is held under prestress between the support and guide.

The bolt element is preferably mounted on the support in ball bearings here.

According to a further idea on which the invention is based, at least two, but preferably all four, wheels are mounted on the bogie so as to be pivotable about a vertical axis in order to be able to steer the rail car shunting device in a desired direction when the bolt elements are retracted in the road mode and, if desired, also to be able to rotate them on the spot.

For this purpose, preferably all four wheels can be pivoted individually by means of servomotors, with the servomotors being actuable from the driver's cab via a central control device. However, in the same way there is also the possibility of driving at least two of the wheels, as in the case of a passenger car, by means of a known steering gear.

In order to transmit the largest possible torque from the wheels to the rails, in the preferred embodiment of the invention preferably all four wheels are driven, with in particular each wheel being assigned a separate drive motor which drives the wheel in particular by means of a gear mechanism. This results, in combination with the previously described individual pivotability of the wheels, in a rail car shunting device which can turn in a very small space, in particular in the road mode, as a result of which even small run-up ramps are sufficient in order to move the vehicle onto the rails. In addition, the drive via four individual motors opens up the possibility of regulating the drive torques of the engines by means of a suitable control device in such a way that a slip or even unbraked spinning of the wheels in the shunting mode with a high load can be prevented.

In this context, it proves particularly advantageous if the drive motors are electric motors since, owing to their compact design and the comparatively high startup torques compared to internal combustion engines, they can be connected by flanges directly to their respective drive wheel via a suitable gear mechanism, for example a bevel gear mechanism.

In order to obtain a high degree of flexibility of the rail car shunting device according to the invention, the electric motors are preferably fed from a known accumulator battery, and it is also conceivable to additionally provide a current generator on the bogie in order to charge up or intermediately charge the accumulator battery during relatively lengthy shunting operations. However, in the same way it is also possible to use hydraulic motors and a hydraulic assembly which is fed by an electric motor or an internal combustion engine.

Other features which are considered as characteristic for the invention are set forth in the appended claims.

Although the invention is illustrated and described herein as embodied in rail car shunting device for road-rail operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2A is a schematic view of a detail of the adjusting device and of the guide bolt in the first retracted position for the road mode;

FIG. 2B is a schematic view of a detail of the adjusting device and of the guide bolt in the second deployed position for the rail mode;

FIG. 3A is a schematic view of a detail of a further embodiment of the invention in the first retracted position; and FIG. 3B is a schematic view of a detail of the embodiment in FIG. 3A in the second deployed position for the rail mode.

DETAILED DESCRIPTION OF THE INVENTION

Figure 1:
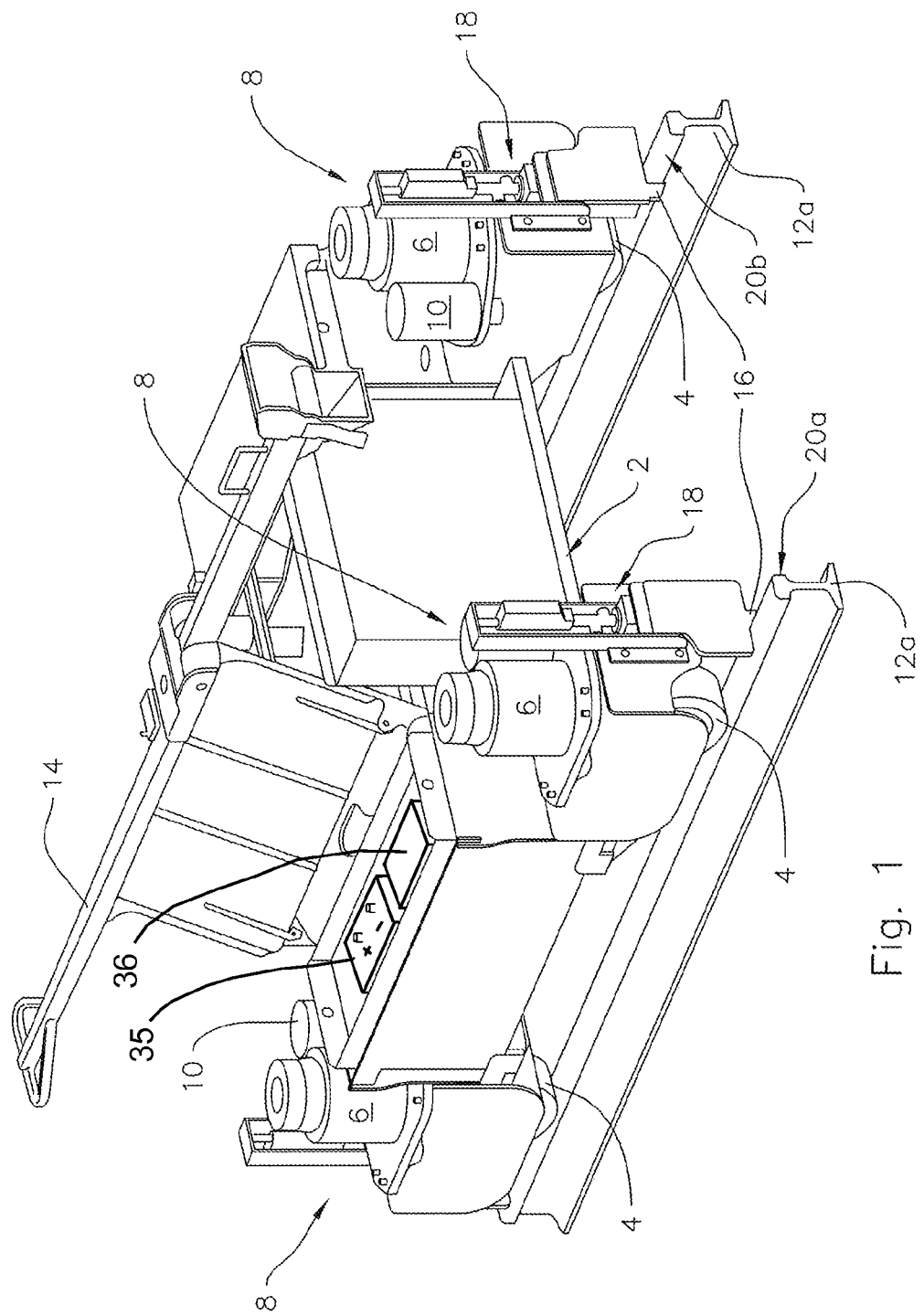
FIG. 1 shows a schematic perspective view of the rail car shunting device according to the invention.

Referring now to the figures of the drawing in detail and first, particularly, to FIGS. 1, 2A and 2B, a rail car shunting device 1, which may also be referred to as a rail car mover, a switching vehicle, or a road-rail vehicle, comprises a bogie 2 on which a total of four wheels are arranged which have rubber tires and which are each driven by an assigned drive motor 6, in the form of motor wheel units 8 such as are known, for example, from fork lifts and stacker trucks. The motor wheel units 8 can pivot here about pivot axes that extend in the vertical direction in FIG. 1, by means of servomotors 10 which are assigned to each motor wheel unit 8, in order to be able to steer the rail car shunting device 1 according to the invention in the road mode, for example when it moves up a run-up ramp onto the rails 12a, 12b which are likewise indicated in FIG. 1. For this purpose, it is possible to arrange on the rail car shunting device 1 a drawbar 14 which acts on the servomotors 10 via rotary encoders (not shown in more detail) and a control device (not shown in more detail) and activates the servomotors 10 in the horizontal direction, for example when the drawbar 14 pivots, in such a way that the motor wheel units 8 are correspondingly also pivoted.

As can be also seen in the illustration in FIG. 1, each wheel is assigned a bolt element or guide bolt 16 which can be moved by means of an adjusting device 18 from a first retracted position (shown in FIG. 2A) for the road mode in which the ground-side end face of the bolt element situated above the rolling plane 5 of the wheels 4 which is defined by the upper side of the two rails 12a, 12b, into a second deployed position for the rail mode, as is indicated in FIG. 2B and FIG. 1. In this second position, the ground-side end faces of the bolt elements 16 are located underneath the rolling level 5 so that the external circumferential faces of the bolt elements have two wheels 4, assigned to one another, of an imaginary axis of the rail car shunting device 1 extend at a small distance from one another on the inner lateral edges 20a and 20b of the two rails 12a, 12b. In the same way there is of course also the possibility of the bolt elements 16 extending down on the outer lateral edges of the rails in order to guide the rail car shunting device according to the invention along the rails 12a, 12b in the rail mode shown in FIG. 1.

The bolt elements 16 are preferably composed of hardened steel and can have, for example, a diameter of 30 mm.

As can also be inferred from the illustration in FIGS. 2A and 2B, the adjusting device 18 acts via a pull rod 32 on a guide 22 which is mounted on the bogie 2, and a support 24 which is guided in the guide 22 and movable in relation to it and on which the bolt element 16 is rotatably mounted in ball bearings 26.

A helical compression spring 28 which acts, on the one hand, on the upper side of the support 24 which faces away from the rails 12a, 12b and on the inner side of the housing of the guide 22, and applies a spring elastic force to the support 24, and by means of the latter to the bolt element 16 in the direction of the rails 12a, 12b, is mounted between the support 24 and the guide 22.

In order to move the bolt element 16 from the retracted, first position (shown in FIG. 2A) into the deployed position (shown in FIG. 2B) for the rail mode, the adjusting device 18, which can comprise, for example, a pneumatic cylinder or else an electric servomotor, reduces its traction force on the support 24 which is transmitted to a plate-like head part via the pull rod 32 which engages through the guide 22, so that the support 24, and by means of it the bolt element 16, is pushed in the direction of the rails 12a, 12b within the guide 22 by the force of the helical spring 28.

In the process, the movement of the support 24 in the second deployed position (FIG. 2B) is limited by a stop 30 which is provided only by way of example on the pull rod 32 in FIGS. 2A and 2B and which permits the helical spring 28 to act between the support 24 and guide 22 under prestress.

According to a further alternative embodiment of the invention which is indicated in FIGS. 3A and 3B, instead of the bolt element 16 which extends in the vertical direction a disk element 116 which is guided parallel to the rails 12a, 12b is used. The latter can be moved, in the same way as the bolt element 16, by means of the adjusting device 18 out of the first retracted position (shown in FIG. 3A) for the road mode, in which position the disk element 116 is located above the rolling level 5 and out of contact with the rails 12a, 12b, in the direction of the ground and into the second deployed position (shown in FIG. 3B) for the rail mode.

For this purpose, the support 124 which is preferably configured in a fork shape in the manner of a rocker and guided in the guide 22 has, in the region of its ground-side end, a receptacle for a wheel axis 117 which, in the preferred embodiment, is rotatably mounted in the support 124 in ball bearings 126. After the support 124 has been deployed into the second position (shown in FIG. 3B), the disk element 116 extends at least with part of its lateral end face or edge face 121, lying underneath the wheel axle 117, along the inner lateral edges 20a, 20b and/or the outer lateral edges of the rails 12a, 12b in order to ensure, in the same way as in the previously described embodiment according to FIGS. 2A and 2B, that the shunting device 1 is guided along the rails 12a, 12b. What has been stated above in relation to the activation of the bolt element 16 which extends in the vertical direction applies correspondingly also to the embodiment in FIGS. 3A and 3B.

The necessary drive power may be supplied from an accumulator battery 35 and the operation is controlled by a control device 36.

The invention claimed is:

1. A rail car shunting device for road-rail operation, for shunting rail cars guided on a track with mutually parallel rails, comprising:

a bogie;

wheels with rubber tires mounted on said bogie, said wheels defining a rolling level;

bolt elements each assigned to a respective said wheel and mounted for movement from a first, retracted position for a road mode in which a lower end face of said bolt element is disposed above said rolling level of said wheel, downward beyond said rolling level into a second, deployed position for a rail mode in which said lower end face of said bolt element is disposed below said rolling level;

an adjusting device for moving each said bolt element between said retracted position for the road mode and said deployed position for the rail mode, such that, in said deployed position, outer peripheral faces of said bolt elements of two wheels that are assigned to one another extend along an inner lateral edge and/or an outer lateral edge of the rails in order to guide said wheels on the rails;

said four wheels each being pivotally mounted on said bogie and rotatable by way of servomotors, and each said wheel having a respective drive motor assigned thereto for driving the respective said wheel, in order to do drive and steer the rail car shunting device in a desired direction in the road mode when said elements are retracted.

2. The rail car shunting device according to claim 1, which comprises a spring elastic device disposed to apply a downward spring elastic force on said bolt element.

3. The rail car shunting device according to claim 1, wherein said adjusting device comprises a servomotor acting on said bolt element and configured to move said bolt element from said first position into said second position.

4. The rail car shunting device according to claim 1, wherein said bolt element is rotatably mounted in bearings.

5. The rail car shunting device according to claim 1, wherein said adjusting device comprises a guide fixedly mounted to said bogie and a support movably guided in said guide and holding said bolt element.

6. The rail car shunting device according to claim 5, which comprises a helical spring disposed between said support and said guide and applying a spring elastic force to said support.

7. The rail car shunting device according to claim 6, which comprises a stop disposed to limit a movement of said support into the second, deployed position, and wherein said helical spring acts under prestress between said support and said guide.

8. The rail car shunting device according to claim 5, wherein said bolt element is rotatably held on said support in ball bearings.

9. The rail car shunting device according to claim 1, which comprises a gear mechanism for individually driving each said wheel.

10. The rail car shunting device according to claim 9, which further comprises an accumulator battery and a control device disposed on said bogie, and wherein said drive motor is an electric motor supplied with electrical energy via said accumulator battery.

11. The rail car shunting device according to claim 9, wherein each said drive motor and the respectively assigned wheel form a motor wheel unit pivotally mounted on said bogie.

12. A rail car shunting device for road-rail operation, for shunting rail cars guided on tracks with mutually parallel rails, comprising:

a bogie;

wheels with rubber tires mounted on said bogie, said wheels defining a rolling level;

disk elements each assigned to a respective said wheel and mounted for movement from a first, retracted position for a road mode in which said disk element is disposed above said rolling level of said wheel, downward beyond said rolling level into a second, deployed position for a rail mode;

an adjusting device for moving each said disk element between said retracted position for the road mode and said deployed position for the rail mode, such that, in said deployed position, lateral end faces of said disk elements of two wheels that are assigned to one another extend along an inner lateral edge and/or an outer lateral edge of the rails in order to guide said wheels on the rails;

said four wheels each being pivotally mounted on said bogie and rotatable by way of servomotors, and each said wheel having a respective drive motor assigned thereto for driving the respective said wheel, in order to do drive and steer the rail car shunting device in a desired direction in the road mode when said disk elements are retracted.

13. The rail car shunting device according to claim 12, which comprises a spring elastic device disposed to apply a downward spring elastic force on said disk element.

14. The rail car shunting device according to claim 12, wherein said adjusting device comprises a servomotor acting on said disk element and configured to move said disk element from said first position into said second position.

15. The rail car shunting device according to claim 12, wherein said the disk element is rotatably mounted in bearings.

16. The rail car shunting device according to claim 12, wherein said adjusting device comprises a guide fixedly mounted to said bogie and a support movably guided in said guide and holding said disk element.

17. The rail car shunting device according to claim 16, which comprises a helical spring disposed between said support and said guide and applying a spring elastic force to said support.

18. The rail car shunting device according to claim 17, which comprises a stop disposed to limit a movement of said support into the second, deployed position, and wherein said helical spring acts under prestress between said support and said guide.

19. The rail car shunting device according to claim 16, wherein said disk element is rotatably held on said support in ball bearings.

20. The rail car shunting device according to claim 12, which comprises a gear mechanism for individually driving each said wheel.

21. The rail car shunting device according to claim 20, which further comprises an accumulator battery and a control device disposed on said bogie, and wherein said drive motor is an electric motor supplied with electrical energy via said accumulator battery.

22. The rail car shunting device according to claim 20, wherein each said drive motor and the respectively assigned wheel form a motor wheel unit pivotally mounted on said bogie.

* * * * *